United States Patent
Devale

(10) Patent No.: US 9,877,018 B2
(45) Date of Patent: *Jan. 23, 2018

(54) MANAGING A DISPLAY

(71) Applicant: International Business Machines Corporation, Armonk, NY (US)

(72) Inventor: Santosh Devale, Davangere (IN)

(73) Assignee: International Business Machines Corporation, Armonk, NY (US)

( * ) Notice: Subject to any disclaimer, the term of this patent is extended or adjusted under 35 U.S.C. 154(b) by 525 days.

This patent is subject to a terminal disclaimer.

(21) Appl. No.: 14/559,996

(22) Filed: Dec. 4, 2014

(65) Prior Publication Data

US 2015/0365658 A1    Dec. 17, 2015

Related U.S. Application Data

(63) Continuation of application No. 14/303,669, filed on Jun. 13, 2014, now Pat. No. 9,723,298.

(51) Int. Cl.
| | | |
|---|---|---|
| *G06T 15/20* | (2011.01) | |
| *H04N 13/04* | (2006.01) | |
| *G06F 3/01* | (2006.01) | |

(52) U.S. Cl.
CPC ........ *H04N 13/0479* (2013.01); *G06F 3/012* (2013.01); *G06F 3/013* (2013.01); *G06T 15/20* (2013.01); *H04N 13/0484* (2013.01)

(58) Field of Classification Search
CPC ........ G06F 3/012; G06F 3/013; G06T 15/20; H04N 13/0479; H04N 13/0484
See application file for complete search history.

(56) References Cited

U.S. PATENT DOCUMENTS

| | | |
|---|---|---|
| 5,602,564 A | 2/1997 | Iwamura et al. |
| 6,229,542 B1 | 5/2001 | Miller |
| (Continued) | | |

FOREIGN PATENT DOCUMENTS

| | | |
|---|---|---|
| CN | 102446050 A | 5/2012 |
| JP | 2009058991 A | 3/2009 |
| KR | 1020130068732 A | 6/2013 |

OTHER PUBLICATIONS

Boxall, A., "HP working on new holographic 3D display technology for smartphones and tablets", Digital Trends, Mar. 21, 2013. http://www.digitaltrends.com/mobile/hp-working-on-new-holographic-3d-display-technology/.

(Continued)

*Primary Examiner* — Sing-Wai Wu
(74) *Attorney, Agent, or Firm* — Jay Wahlquist

(57) ABSTRACT

A system and computer implemented method for managing a display for a software application is disclosed. The software application may have a set of portions. The method can include collecting, for a first portion and a second portion of the set of portions, optical tracking information including a set of viewing coordinates having a temporal feature. The method can also include determining, based on the optical tracking information including the set of viewing coordinates having the temporal feature, a set of viewing scores including a first group of viewing scores and a second group of viewing scores. The method can also include generating a frustum having a set of regions. The set of regions can include a first region, to provide the first portion, based on the first group of viewing scores, and a second region, to provide the second portion, based on the second group of viewing scores.

8 Claims, 10 Drawing Sheets

(56) References Cited

U.S. PATENT DOCUMENTS

| | | | |
|---|---|---|---|
| 6,822,662 | B1 | 11/2004 | Cook et al. |
| 7,119,819 | B1 | 10/2006 | Robertson et al. |
| 2009/0175766 | A1 | 7/2009 | deCorral |
| 2012/0131496 | A1 | 5/2012 | Goossens et al. |
| 2014/0225887 | A1 | 8/2014 | Aguirre-Valencia |

OTHER PUBLICATIONS

Devale, S., "Managing a Display", U.S. Appl. No. 14/303,669, filed Jun. 13, 2014.

Kumar, M. et al., "EyeExpose: Switching Applications with Your Eyes", Stanford University, HCI Group. pp. 1-7.

Meers, et al., "Haptic Gaze-tracking Based Perception of Graphical User Interfaces", 11th International Conference Information Visualization (IV '07). 7 pages. © 2007 IEEE.

Purcher, J., "Apple Working on Hot 3D Eye-Tracking Interface for Gaming & iPhone", Patently Apple,. Last updated Feb. 9, 2012 at 08:31 a.m. http://www.patentlyapple.com/patently-apple/2012/02/apple-working-on-hot-3d-eye-tracking-interface-for-gaming-iphone.html.

Unknown, "Future of 3D—3D Market Could Be Worth US$22 Billion by 2018", TrendHunterTech. 4 pages. http://www.trendhunter.com/trends/3d-cinema-display-technology.

Unknown, "Eye Tracking", Wikipedia, last modified on Feb. 10, 8:37. http://en.wikipedia.org/wiki/Eye_tracking.

Unknown, "Stereo Display", Wikipedia. Last modified on Jan. 23, 2014 at 09:00. http://en.wikipedia.org/wiki/Stereo_display.

List of IBM Patents or Patent Applications Treated as Related.

| 602 — Viewing Scores | Display Angles — 604 | 600 |
|---|---|---|
| 0 | 90 | |
| 14 | 76 | |
| 26 | 64 | |
| 44 | 46 | |
| 61 | 29 | |
| 68 | 22 | |
| 73 | 17 | |
| 85 | 5 | |

FIG. 6

MANAGING A DISPLAY

BACKGROUND

Aspects of the present disclosure, in certain embodiments, are directed toward a method for a computer system. More particular aspects relate to managing windows of software application.

Three-dimensional (3D) display technology is an emerging trend in the personal computing and entertainment industry. Eye tracking is another recent technique that can be leveraged to provide benefits in the realm of display technology. Together, 3D display technology and eye tracking techniques may be used to provide benefits for personal computing and entertainment.

SUMMARY

Aspects of the present disclosure, in certain embodiments, are directed toward a method and system for managing a display for a software application. The software application may have a set of portions. In certain embodiments, the method can include collecting, for a first portion of the set of portions and a second portion of the set of portions, optical tracking information including a set of viewing coordinates having a temporal feature. In certain embodiments, the method can also include determining, based on the optical tracking information including the set of viewing coordinates having the temporal feature, a set of viewing scores including a first group of viewing scores and a second group of viewing scores. Additionally, in certain embodiments, the method can also include generating a frustum having a set of regions. The set of regions can include a first region, to provide the first portion, based on the first group of viewing scores, and a second region, to provide the second portion, based on the second group of viewing scores.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 6 illustrates an example multi-dimensional array, according to embodiments of the present disclosure;

Figure 1A:
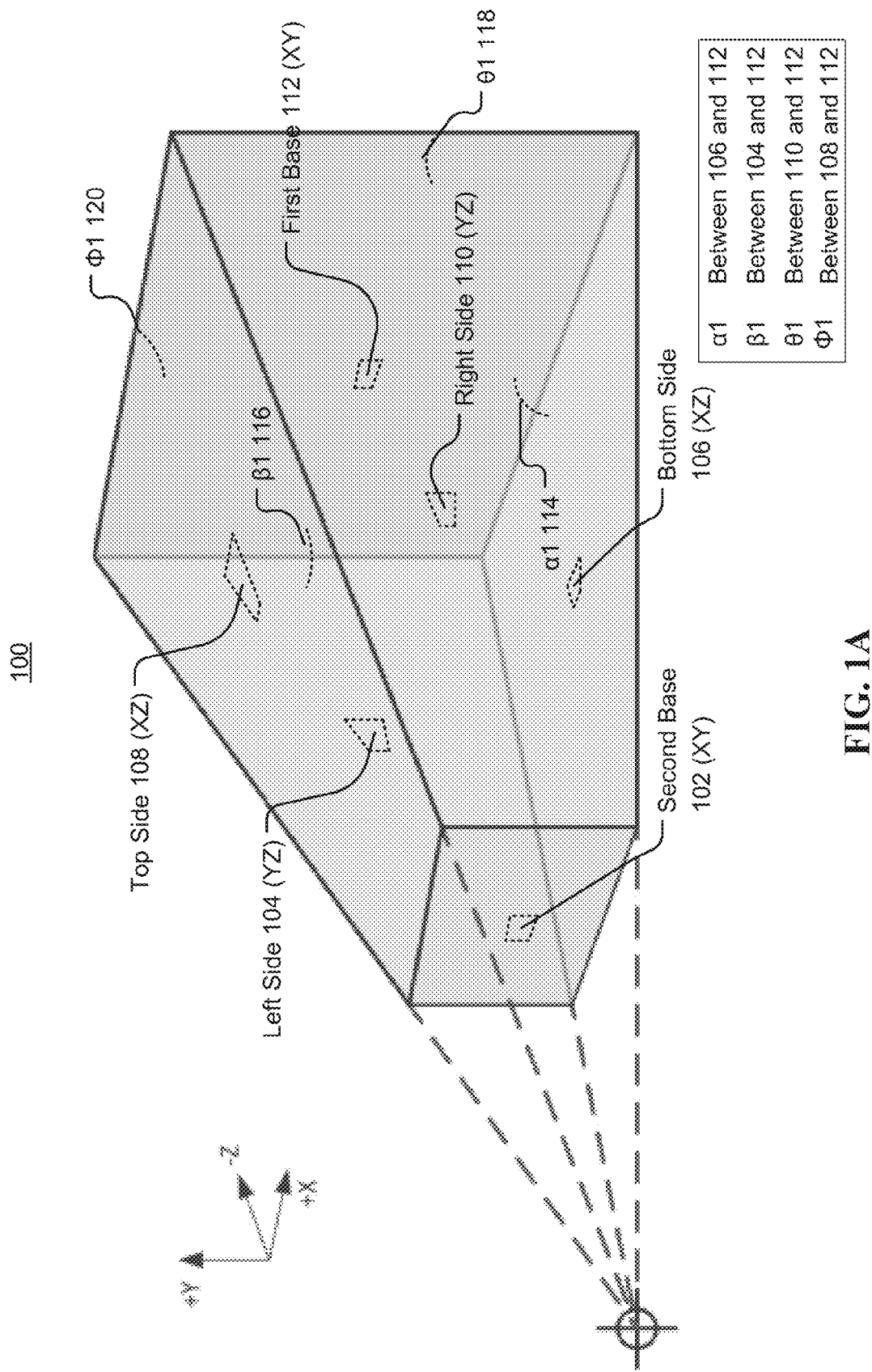
FIG. 1A is an example of a frustum for managing windows of a 3D display, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure, in certain embodiments, are directed toward a method for managing a display. More particular aspects relate to generating a frustum for managing software application windows in a three-dimensional (3D) display. In certain embodiments, the method can include collecting optical tracking information for a first portion and a second portion of a set of portions of the software application. The optical tracking information can include a set of viewing coordinates having a temporal feature (e.g., a viewing frequency or gaze duration). In certain embodiments, the method may include determining a set of viewing scores for the set of portions of the software application. Determining the set of viewing scores for the set of portions of the software application may be based on the set of viewing coordinates having the temporal feature. Additionally, in certain embodiments, the method can also include generating a frustum having a set of regions. The set of regions can include a first region, to provide the first portion, based on the first group of viewing scores, and a second region, to provide the second portion, based on the second group of viewing scores.

When using a computer, switching from one application to another has become a frequent part of the user experience. Users are increasingly engaged in multiple simultaneous tasks on their computers, and may have a large number of windows open at one time. Aspects of the present disclosure relate to the recognition that, as the computer display is of a limited size, users may frequently minimize, toggle, and rearrange windows to view the desired content. Accordingly, aspects of the present disclosure, in certain embodiments, are directed toward a method and system to facilitate management of the windows of a display by leveraging eye-tracking techniques and 3D display technology. More particularly, the present disclosure relates to collecting eye-tracking information from a user to identify which areas (e.g., portions) of a software application are frequently viewed, and generating a three-dimensional frustum in which to display the frequently viewed areas. By making use of 3D display technology, the available space in which to provide the three-dimensional frustum, and therefore the user's desired content, may increase. Accordingly, aspects of the present disclosure may provide benefits associated with ease of use and efficiency.

Aspects of the present disclosure relate to a system and method for generating a frustum to manage windows of a software application in a three-dimensional (3D) display. The method and system may work on a number of devices and operating systems. The software application may have a set of portions (e.g., GUI windows or portions of windows). The method and system can include collecting optical tracking information for a first portion and a second portion of the set of portions. The optical tracking information can include a set of viewing coordinates having a temporal feature. The viewing coordinates may, for example, represent points of the display at which a user was looking. The temporal feature may, for example, include a viewing frequency and a gaze duration.

Aspects of the present disclosure can include determining a set of viewing scores for the set of portions of the software application. The set of viewing scores may include a first group of viewing scores and a second group of viewing scores. Determining the set of viewing scores for the set of portions of the software application can be based on the set of viewing coordinates having the temporal feature. Determining the set of viewing scores for the set of portions of the software application can further include identifying a first fixation of the set of viewing coordinates. The method may then weight the first fixation and the set of viewing coordinates based on the viewing frequency and the gaze duration. Further, the method can include assigning a viewing score of a set of viewing scores to a portion of the set of portions.

Aspects of the present disclosure can include generating a frustum having a set of regions to provide the first portion and the second portion of the set of portions. The first region may provide the first portion of the set of portions based on the first group of the set of viewing scores. The second region may provide the second portion of the set of portions based on the second group of the set of viewing scores. The first region of the set of regions may be a primary viewing area of the frustum. Additionally, the first group of the set of viewing scores may be greater than the second group of the set of viewing scores. Aspects of the present disclosure can also include computing, for the second portion, a z-plane display angle based on at least the one viewing score of the second group of the set of viewing scores, and generating the frustum using the z-plane display angle. The z-plane display angle can be inversely proportional to the at least one viewing score of the second group of the set of viewing scores.

The frustum may, in certain embodiments, include a first base and four peripheral sides. The first base of the frustum may be of the first region of the frustum and the four peripheral sides may be the second region of the frustum. The angle between a side of the four peripheral sides and the first base may be based on the z-plane display angle. Aspects of the present disclosure relate to creating a user profile having a multi-dimensional array. The user profile can be configured to maintain a set of display preferences. The set of display preferences can include a set of viewing scores and a set of z-plane display angles for a set of portions associated with the frustum.

Aspects of the present disclosure include analyzing, by a heuristic evaluation system, a set of usability characteristics of the frustum. The set of usability characteristics of the frustum may include a visibility feature and a current workload. In response to analyzing the set of usability characteristics, the present disclosure can include computing coordinates for the set of regions by utilizing the set of usability characteristics. Further, the present disclosure can include displaying the set of regions according to the computed coordinates. Aspects of the present disclosure are further directed toward measuring, by a head-tracking system, a first head movement including a rotation angle with respect to a reference direction. Based on the first head movement including the rotation angle with respect to the reference direction, a first translation for the frustum can be determined. The frustum can be shifted in the display based on the first translation.

Further aspects of the present disclosure relate to providing another frustum in the display. Providing another frustum can include collecting additional optical tracking information for another first portion and another second portion of another set of portions of another software application. The additional optical tracking information can include another set of viewing coordinates having another temporal feature. Based on the another set of viewing coordinates having another temporal feature, another set of viewing scores including another first group of viewing scores and another second group of viewing scores can be determined. Aspects of the present disclosure can include generating another frustum having another set of regions. The another set of regions can include another first region to provide the another first portion based on the another first group of viewing scores, and another second region to provide the another second portion based on the another second group of viewing scores.

Turning now to the figures, FIG. 1A is an example of a frustum 100 for managing windows of a 3D display, according to embodiments of the present disclosure. FIG. 1A is directed toward a representation of a frustum similar to one that could be generated by the computer-implemented method described herein for managing software application windows of a 3D display. The frustum 100 can include six faces including a second base 102 (lying in the XY plane), a left side 104 (lying in the YZ plane), a bottom side 106 (lying in the XZ plane), a top side 108 (lying in the XZ plane), a right side 110 (lying in the YZ plane), and a first base 112 (lying in the XY plane).

Aspects of the present disclosure, in certain embodiments, relate to a method for generating a frustum-shaped viewing region in which to provide portions of a software application. In certain embodiments, the frustum 100 can be used in conjunction with a three-dimensional monitor, three-dimensional television, or other type of three-dimensional display. The frustum 100 may, in certain embodiments, be a square frustum (e.g., a frustum of a pyramid). In certain embodiments, the frustum can be the frustum of a cone. Other types of frustums are also possible.

Consistent with various embodiments, each face of the frustum 100 can be configured to provide a portion of a software application. In certain embodiments, the portions may be GUI (graphical user interface) windows or areas of GUI windows of a software application. The portions to be provided in each face of the frustum 100 can be determined based on optical tracking information collected from one or more users engaged with the display. Based on the optical tracking information, the portions of the software application can be assigned a viewing score based on the frequency with which the user looks at a particular portion, or the duration that the gaze of the user is directed at the particular portion. In certain embodiments, the first base 112 may be a first region (similarly referred to herein as a primary viewing region) of the frustum 100, and be configured to display the portion or portions of the software application that were assigned the greatest viewing score of the set of viewing scores. The left side 104, bottom 106, top 108 and right side 110 may collectively referred to as the second region (similarly referred to herein as a secondary viewing region.) In certain embodiments, when the first base 112 is used as the primary viewing region, the second base 102 may not be used to provide a portion of a software application, or may be removed from view. The secondary viewing region may be configured to display the portion or portions of the software application that had viewing scores less than the highest viewing score of the set of viewing scores.

Consistent with various embodiments, the frustum 100 may have a set of display angles 114, 116, 118, and 120. As shown in FIG. 1A, display angle α1 114 may measure the angle between the first base 112 and the bottom 106. Display angle β1 116 can measure the angle between the first base 112 and the left side 104. Display angle θ1 118 can measure the angle between the first base 112 and the right side 110. Display angle Φ1 120 can measure the angle between the first base 112 and the top 108. Consistent with various embodiments, each display angle 114, 116, 118, 120 can be calculated based upon the viewing scores assigned to the set of portions of the software application. For example, in certain embodiments, an algorithm can be used to compute each display angle 114, 116, 118, 120 using the respective viewing scores for each portion as inputs.

Figure 1B:
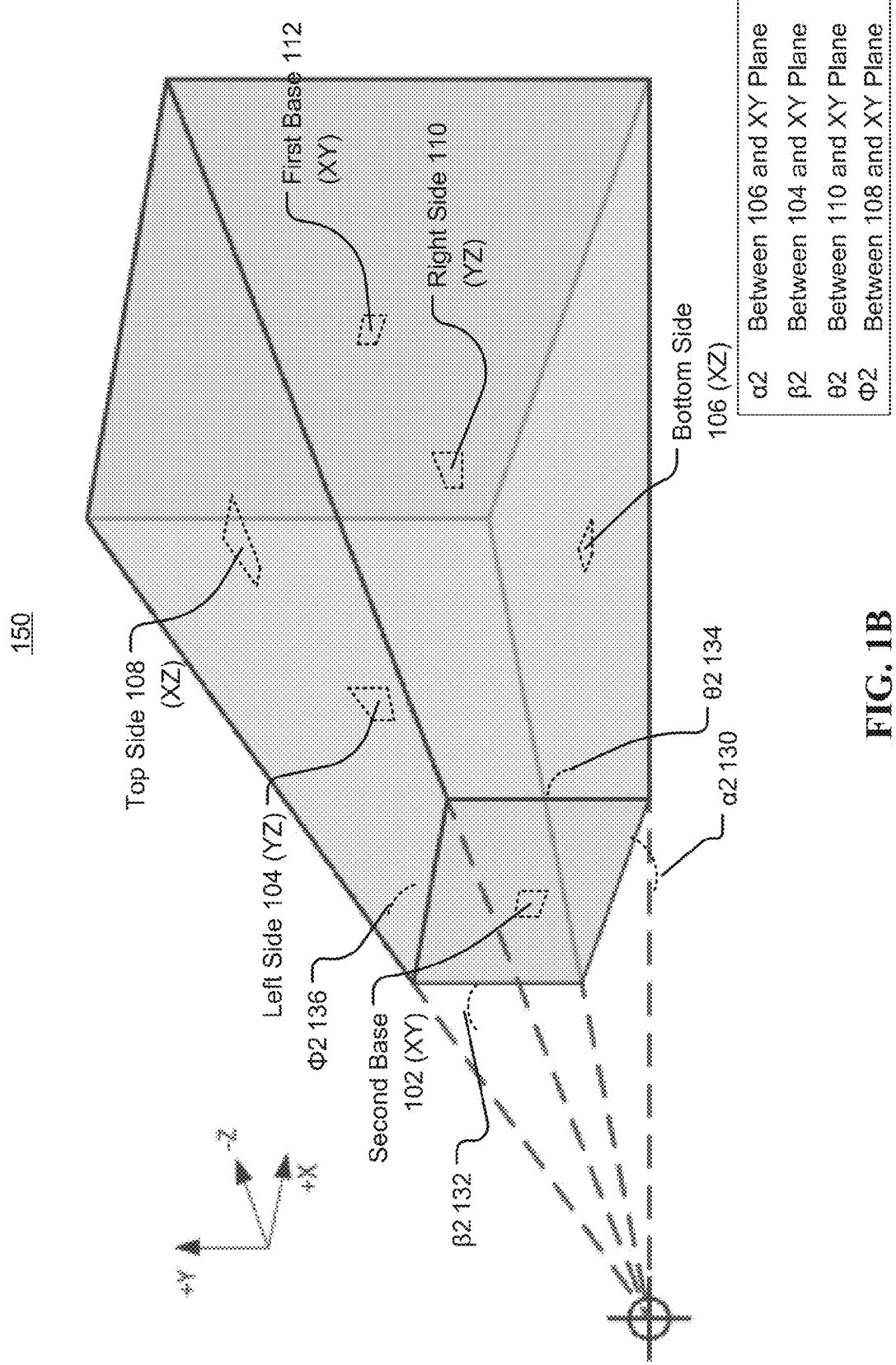
FIG. 1B is an example frustum for managing windows of a 3D display, according to embodiments of the present disclosure.

FIG. 1B is an example of a frustum 150 for managing windows of a 3D display, according to embodiments of the present disclosure. Aspects of FIG. 1B are directed toward a representation of a frustum in which the second base 102 may be a primary viewing region of the frustum 150. The frustum 150 can include six faces including a second base 102 (lying in the XY plane), a left side 104 (lying in the YZ plane), a bottom 106 (lying in the XZ plane), a top 108 (lying in the XZ plane), a right side 110 (lying in the YZ plane), and a first base 112 (lying in the XY plane).

In certain embodiments, the second base 102 may be a first region (similarly referred to herein as a primary viewing region) of the frustum 150, and be configured to display the portion or portions of the software application that were assigned the substantially high (e.g., the greatest) viewing score of the set of viewing scores. The first base 112, left side 104, bottom 106, top 108 and right side 110 may collectively referred to as the second region (similarly referred to herein as a secondary viewing region.) The secondary viewing region may be configured to display the portion or portions of the software application that had viewing scores less than the highest viewing score of the set of viewing scores.

Consistent with various embodiments, the frustum 150 may have a set of display angles 130, 132, 134, 136. As shown in FIG. 1B, display angle α2 130 may measure the angle between the plane of the second base 102 (e.g., the XY plane) and the bottom 106. Display angle β2 132 can measure the angle between the plane of the second base 102 (e.g., the XY plane) and the left side 104. Display angle θ2 134 can measure the angle between the plane of the second base 102 (e.g., the XY plane) and the right side 110. Display angle Φ2 136 can measure the angle between the plane of the second base 102 (e.g., the XY plane) and the top 108. Consistent with various embodiments, each display angle 130, 132, 134, 136 can be calculated based upon the viewing scores assigned to the set of portions of the software application. For example, in certain embodiments, an algorithm can be used to compute each display angle 130, 132, 134, 136.

Figure 2:
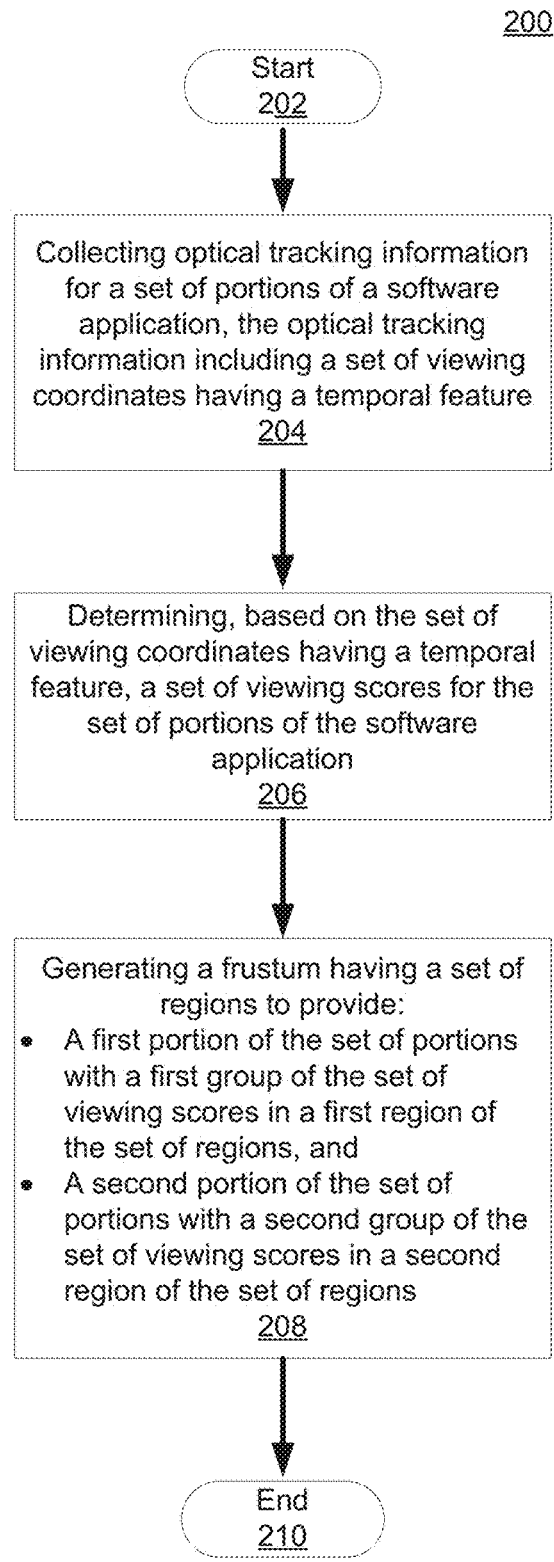
FIG. 2 is a flowchart of a method for managing a display, according to embodiments of the present disclosure.

FIG. 2 is a flowchart of a method 200 for managing a display, according to embodiments of the present disclosure. Aspects of FIG. 2 are directed toward generating a frustum for managing software application windows in a three-dimensional display. The method 200 may begin at block 202 and end at block 210. Consistent with various embodiments, the method 300 can include a collecting block 204, a determining block 206, and a generating block 208.

Consistent with various embodiments, at block 204 the method 200 can include collecting optical tracking information. The optical tracking information may be collected for a set of portions of a software application. For example, the optical tracking information may be collected for a first portion and a second portion of the set of portions. The first portion and the second portion may, as described herein, be GUI windows or areas of a software application. The optical tracking information can include a set of viewing coordinates having a temporal feature. Collecting the optical tracking information can be accomplished using one or more of a variety of different methods. For example, collecting the optical tracking information can include using a video-based eye tracking system, an electric potential measurement system, a non-contact optical system, or other type of system for tracking eye movement. Consistent with various embodiments of the present disclosure, collecting the optical tracking information can include using a video camera configured to focus on one or both eyes of a user, and record the rotations of the eye or eyes as the user looks at a display (e.g., a computer monitor, 3D display, etc.). In certain embodiments, the video camera can include using the center of the pupil and infrared/near-infrared non-collimated light to monitor corneal reflection in the eye of the user. The vector between the center of the pupil and the corneal reflection can be used to compute the viewing coordinates on the display at which the gaze of the user is directed.

Consistent with various embodiments, the set of viewing coordinates may be used to identify a software application at which the user is looking. For example, the method 200 can include comparing the viewing coordinates with the relative location of an open software application window active on the display to identify the software application. More particularly, aspects of the present disclosure are directed toward identifying a set of portions (e.g., portions of the graphical user interface) of the software application. As an example, in certain embodiments, the software application may be a video conferencing application having a video display portion, a contacts portion, a text entry portion, a call settings portion, and an advanced options portion. Based on the location of the viewing coordinates, the method 200 can identify the portions of the software application. In certain embodiments, the viewing coordinates can include a temporal feature. More particularly, the temporal feature can include a viewing frequency or a gaze duration. The viewing frequency can indicate the number of times a user looks at a particular location (e.g., a particular set of viewing coordinates) for a given time interval. The gaze duration can indicate the length of time that a user looks at a particular location. As an example, the temporal feature of the viewing coordinates may indicate that user looks at a particular location 3 times a minute (e.g., the viewing frequency) with a duration of 6 seconds each time (e.g., the gaze duration).

Consistent with various embodiments, at block 206 the method 200 can include determining a set of viewing scores for the set of portions of the software application. In certain embodiments, determining the set of viewing scores may be based on the set of coordinates having the temporal feature. The set of viewing scores may generally indicate how much (e.g., how frequently, and for what duration) a user is looking at a particular portion of the software application. The set of viewing scores may, in certain embodiments, include a first group of viewing scores and a second group of viewing scores. Consistent with various embodiments, determining the set of viewing scores for the set of portions of the software application can include identifying a first fixation of the set of viewing coordinates. The first fixation can, in certain embodiments, be an indication that a particular subset of the set of viewing coordinates is of particular relevance or importance for a given viewing session of a user. As an example the first fixation can be a particular location (e.g., a particular set of viewing coordinates) that has a viewing frequency value greater than a viewing frequency threshold (e.g., 5 times per 60 seconds) or a gaze duration value greater than a gaze duration threshold (e.g., 10 seconds each time). In certain embodiments, the first fixation could have a viewing frequency value greater than a viewing frequency threshold as well as a gaze duration value greater than a gaze duration threshold. Other ways of identifying the first fixation are also possible.

The method 200 can further include weighting the first fixation and the set of viewing coordinates based on the viewing frequency and the gaze duration. In certain embodiments, the viewing coordinates that have relatively large viewing frequency values and gaze duration values can be weighted more than those viewing coordinates with relatively low viewing frequency values and gaze duration values. As an example, in certain embodiments, the first fixation having a viewing frequency value (e.g., 8 times per 60 seconds) greater than a viewing frequency threshold (e.g., 5 times per 60 seconds) and a gaze duration (13 seconds per time) greater than a gaze duration threshold (e.g., 11 seconds per time) may receive a greater weighting factor than the other viewing coordinates. Further, the method 200 can include assigning a viewing score to a portion of the set of portions. The viewing scores can be a cumulative indication of the frequency and duration with which a user looks at a particular location (e.g., set of viewing coordinates). Put differently, a first portion having a greater viewing score than a second portion (e.g., 64 versus 39) can indicate that the first portion is viewed more (e.g., more frequently and for a longer duration) than the second portion. In certain embodiments, assigning the viewing score can be based on weighting the first fixation and the set of viewing coordinates. For example, those viewing coordinates with greater weight can be assigned greater viewing scores.

The viewing scores may be determined in one of a number of ways. In certain embodiments, the method 200 can include performing one or more cluster analysis techniques on the viewing coordinates located within a particular portion of a software application to determine the viewing scores for the particular portion. For example, the cluster analysis techniques may include hierarchical clustering, centroid-based clustering, density-based clustering, distribution-based clustering, and the like. Accordingly, the cluster analysis technique can make use of the number of viewing coordinate points within a particular area along with corresponding viewing frequency and gaze duration information to generate the viewing coordinates.

In accordance with the example discussed above, the software application may be a video conferencing application having a video display portion, a contacts portion, a text entry portion, a call settings portion, and an advanced options portion. The user of the video conferencing application may be participating in a video conference, and may be primarily focusing his or her gaze on the video display portion, as the video conference host gives a presentation. He or she may also be frequently glancing at the text entry portion, as participants in the video conference submit questions and comments to the host of the video conference. He or she may look intermittently at the contacts portion to see who else is participating in the video conference. At less frequent intervals, he or she may look at the call settings portion to adjust the video conference resolution or streaming quality. He or she may rarely look at the advanced options portion. Consistent with various embodiments, the method 200 can include collecting optical tracking information from the user, and determining a viewing score for each portion of the set of portions. For example, according to the example described above, the video display portion, text entry portion, contacts portion, call settings portion, and advanced options portion may be assigned viewing scores of 85, 39, 24, 18, and 9, respectively.

Consistent with various embodiments, at block 208 the method 200 can include generating a frustum having a set of regions configured to provide a set of portions of a software application. In certain embodiments, the set of portions can include a first region (e.g., a primary viewing region) to provide the first portion based on the first group of viewing scores. In certain embodiments, the set of regions can include a second region (e.g., a secondary viewing region) to provide the second portion based on the second group of viewing scores. The first group of the set of viewing scores can, in certain embodiments, be greater than the second group of the set of viewing scores. Accordingly, the portions that are viewed more (e.g., more frequently and/or for a longer duration) can be displayed in the primary viewing region of the frustum, and the portions that are viewed less (e.g., less frequently and/or for a shorter duration) can be provided in the second region of the frustum.

Consistent with various embodiments, the method 200 can further include computing, for the second portion, a z-plane display angle (similarly referred to herein as a display angle) based on at least one viewing score of the second group of the set of viewing scores. The z-plane display angle can be an angle between one or more planes of the frustum. In certain embodiments, the z-plane display angle may be an angle between one or more planes extending at least partially in the z-direction (e.g., the XZ plane or the YZ plane). In certain embodiments, the display angle can be computed by an algorithm using the viewing score. In certain embodiments, the display angle can be inversely proportional to the viewing score. Put differently, greater viewing scores can correspond to lesser display angles, while lower viewing scores can correspond to greater display angles. Further, the method 200 can include generating the frustum using the display angle. More specifically, the display angle can be used as the angle between a side of the frustum and the primary viewing region of the frustum (e.g., angle 114, 116, 118, or 120 of FIG. 1A or angle 130, 132, 134, 136 of FIG. 1B). As described herein, relatively high display angles will effectively reduce the viewing area of a particular portion provided in the frustum, while relatively low display angles will effectively increase the viewing area of a particular portion provided in the frustum. Accordingly, portions that are viewed more (e.g., greater viewing frequency and longer gaze duration) will have larger viewing areas within the frustum.

Consider once again the example described above wherein the software application is a video conferencing application having a video display portion, text entry portion, contacts portion, call settings portion, and advanced options portion with assigned viewing scores of 85, 39, 24, 18, and 9, respectively. In certain embodiments, as the video display portion has the greatest viewing score of the set of portions, it can be provided in the primary viewing area (e.g., the first base 112 of FIG. 1A, or the second base 102 of FIG. 1B). The other four portions of the set of portions can be assigned computed display angles based on their viewing scores. For example, in certain embodiments, the text entry portion, contacts portion, call settings portion, and advanced options portion can be assigned display angles of 51°, 66°, 72°, and 81°.

Figure 3A:
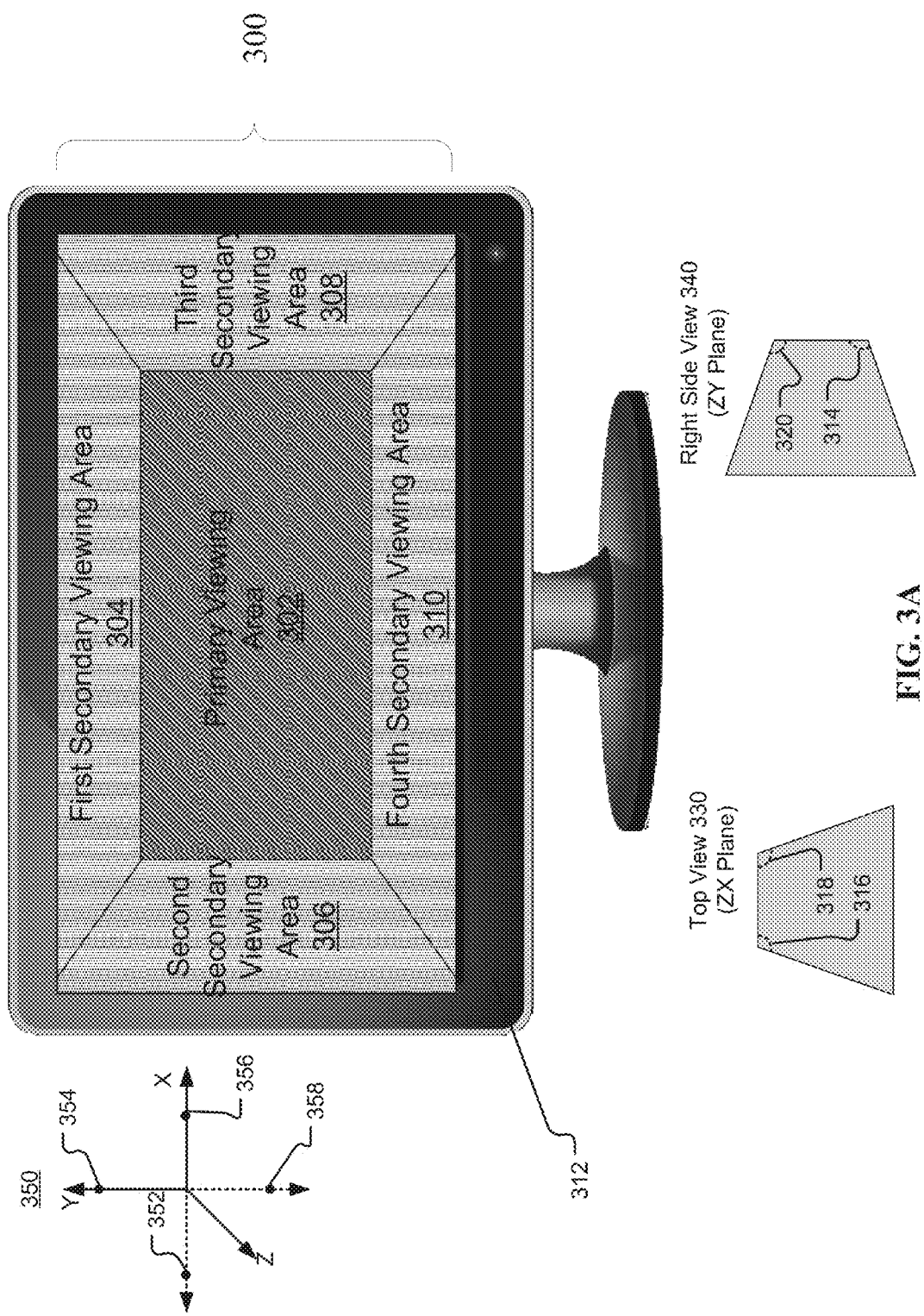
FIG. 3A is an example viewing frustum provided in a display, according to embodiments of the present disclosure.

FIG. 3A is an example viewing frustum 300 provided in a display, according to embodiments of the present disclosure. Aspects of FIG. 3A are directed toward a viewing frustum 300 with a plurality of regions configured to provide one or more portions of a software application. As shown in FIG. 3A, the example viewing frustum 300 can include a primary viewing area 302, a first secondary viewing area 304, a second secondary viewing area 306, a third secondary viewing area 308, and a fourth secondary viewing area 310.

Consistent with various embodiments, viewing frustum 300 is an example implementation of the disclosure discussed herein. In certain embodiments, viewing frustum 300 can be provided in a 3D computer monitor 312. In certain embodiments, viewing frustum 300 can be provided via another form of display that may or may not be configured for 3D output, such as a television, a tablet, a mobile device (e.g., smart phone, cell phone, etc.), or the like. As described herein, the viewing frustum 300 can be configured to provide one or more portions of a software application. The one or more portions of the software application may be identified based on optical tracking information collected from a user.

As described herein, in certain embodiments, the viewing frustum 300 can be configured for stereoscopic 3D display. In certain embodiments, this can facilitate a perception of depth for the viewing frustum 300. For example, the primary viewing area 302 may, in certain embodiments, appear to be a further distance away from a user looking at the computer monitor 312 than the first secondary viewing area 304, second secondary viewing area 306, third secondary viewing area 308, and fourth secondary viewing area 310. Accordingly, the first secondary viewing area 304, second secondary viewing area 306, third secondary viewing area 308, and fourth secondary viewing area 310 may appear to extend toward the user along the direction of the Z-axis of coordinate axes 350 as shown in FIG. 3A. Although reference is made herein to stereoscopic 3D display, the 3D effect may be implemented by one or more of a number of 3D technologies. For example, the 3D effect may be implemented via an anaglyph 3D system, a polarized 3D system, an active shutter 3D system, an autostereoscopy system, or the like. Other systems are also possible.

Consistent with various embodiments, primary viewing area 302 can correspond with the first base 112 of FIG. 1A. As shown in top view 330 FIG. 3A, the viewing frustum 300 can include a display angle 316 and a display angle 318. Additionally, as shown in right side view 340 of FIG. 3A, the viewing frustum can include a display angle 314, and a display angle 320. In certain embodiments, display angle 314 can correspond with display angle α1 114 of FIG. 1A, display angle 316 can correspond with display angle β1 116 of FIG. 1A, display angle 318 can correspond with display angle θ1 118 of FIG. 1A, and display angle 320 can correspond with display angle Φ1 120 of FIG. 1A. In certain embodiments, reference point 352 of coordinate axes 350 may be the point from which display angle 316 is measured. Origin point 352 may be located on the X axis of coordinate axes 350. As an example, display angle 316 may vary between 0° and 90°, increasing as it approaches the Z-axis. Similarly, reference point 354 may be the point from which display angle 320 is measured, reference point 356 may be the point from which display angle 318 is measured, and reference point 358 may be the point from which display angle 314 is measured.

In certain embodiments, varying the display angles 314, 316, 318, 320 can vary the size of the area allotted for each portion of the software application. For example, the second secondary viewing area 306 may decrease in size as the display angle 316 increases, where 0° offers high visibility and 90° effectively removes the second secondary viewing area 306 from view. In certain embodiments, as the display angle 316 decreases, the size of the second secondary viewing area 306 may increase. Put differently, first secondary viewing area 304, second secondary viewing area 306, third secondary viewing area 308, and fourth secondary viewing area 310 can "fold in" to decrease the size of each secondary viewing area, respectively (e.g., the display angle approaches 90°), and "fold out" to increase the viewing area of each secondary viewing area, respectively (e.g., the display angle approaches 0°). Other configurations of the viewing frustum 300 are also contemplated.

In certain embodiments, the one or more portions of the software application to be provided in the viewing frustum 300, as well as the display angles 314, 316, 318, 320 can be determined based on a viewing score of each portion of the software application. (See FIG. 6 for additional discussion of how the viewing scores are generated.) Consider once again the example referenced above wherein the video display portion, text entry portion, contacts portion, call settings portion, and advanced options portion have viewing scores of 85, 39, 24, 18, and 9, respectively. As described above, the text entry portion, contacts portion, call settings portion, and advanced options portion may have been assigned display angles of 51°, 66°, 72°, and 81°, respectively. As an example, in certain embodiments, the video display portion may be displayed in the primary viewing area 302, as it has the highest viewing score. Each portion of the remaining portions (e.g., text entry portion, contacts portion, call settings portion, and advanced options portion) may be provided in one of the secondary viewing areas (e.g., first secondary viewing area 304, second secondary viewing area 306, third secondary viewing area 308, and fourth secondary viewing area 310). For example, the call settings portion may be provided in the first secondary viewing area 304, the contacts portion may be provided in the second secondary viewing area 306, the advanced options portion may be provided in the third secondary viewing area 308, and the text entry portion may be provided in the fourth secondary viewing area 310. As described herein, the display angles 314, 316, 318, 320 may be set based on the determined viewing angle of each portion. For example, display angle 314 may be set to 51° (e.g., the determined display angle of the text entry portion), the display angle 316 may be set to 66° (e.g., the determined display angle of the contacts portion), the display angle 318 may be set to 72° (e.g., the determined display angle of the call options portion), and the display angle 320 may be set to 81° (e.g., that of the advanced options portion).

Aspects of the present disclosure, in certain embodiments, are directed toward using a head-tracking system to provide a user with a greater range of view for the viewing frustum 300. In certain embodiments, the head-tracking system can identify a head movement of a user, and alter the field of view of the frustum 300 based on the user's head movement. Accordingly, the computer monitor 312 could appear to provide a "window" into the viewing frustum 300, such that viewing the computer monitor 312 from a different angle could provide a different perspective of the frustum 300. In certain embodiments, the head-tracking system can include measuring a first head movement including a rotation angle with respect to a reference direction. The first head movement may be measured, for instance, by a video camera mounted atop the computer monitor 312. In certain embodiments, the user may wear a head-mounted module equipped with one or more reflective markers. The video camera may, in certain embodiments, use infrared light reflected from the reflective markers to quantify the first head movement of the user. The rotation angle may, in certain embodiments, correspond to the degree of rotation of the head of a user. The reference direction may be a static point of origin from which the head movement and rotation angle are measured. Based on the first head movement including a rotation angle with respect to the reference direction, a first transition may be determined for the frustum. The first transition, for example, may be a movement in one or more of the six degrees of freedom (e.g., translation and rotation with respect to three perpendicular axes) for a rigid body in three-dimensional space. Based on the first transition, the frustum may be shifted in the display.

Figure 3B:
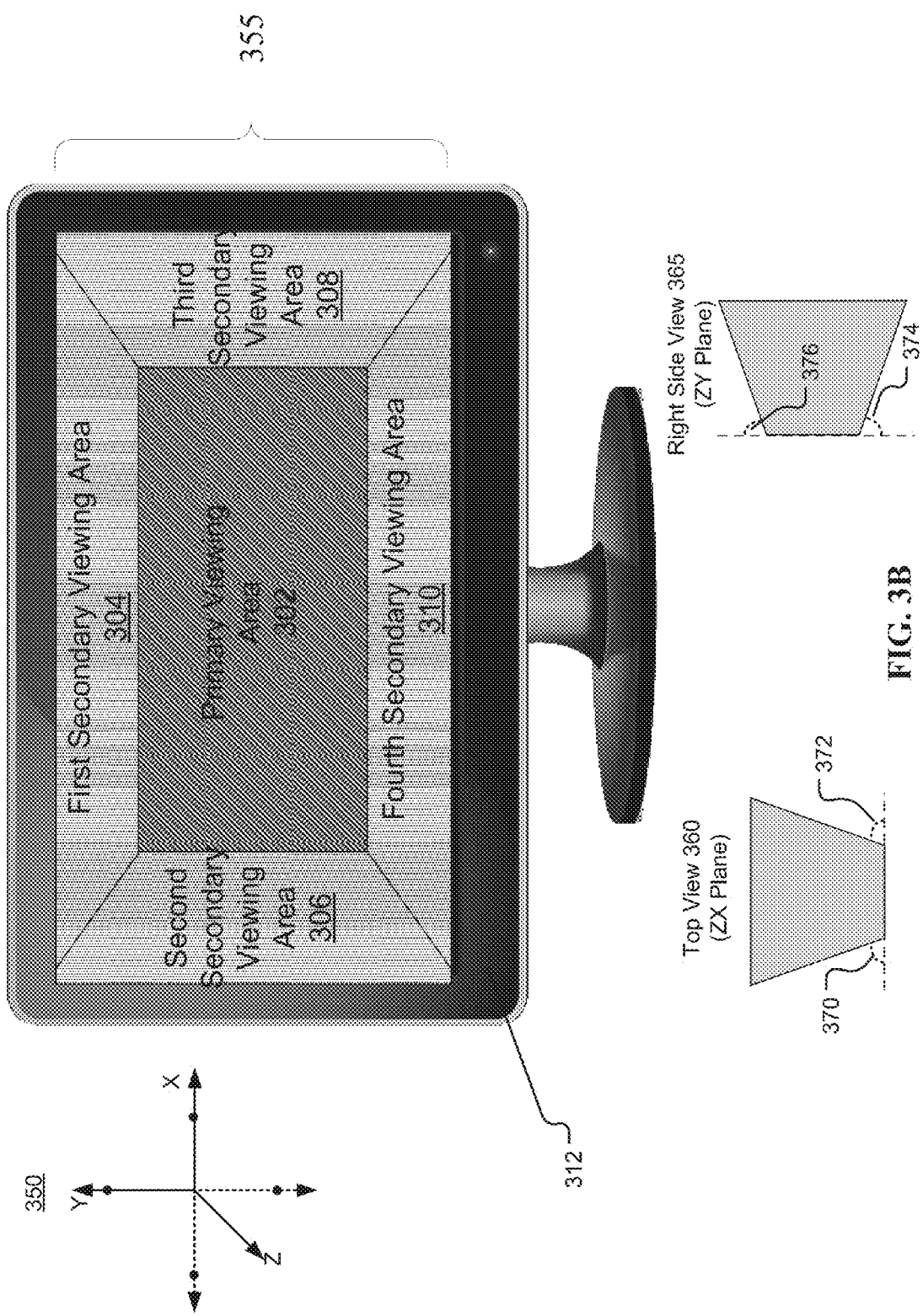
FIG. 3B is an example viewing frustum provided in a display, according to embodiments of the present disclosure.

FIG. 3B is an example viewing frustum 355 provided in a display, according to embodiments of the present disclosure. Aspects of FIG. 3B are directed toward a viewing frustum 355 with a plurality of regions configured to provide one or more portions of a software application. As shown in FIG. 3, the example viewing frustum 355 can include a primary viewing area 302, a first secondary viewing area 304, a second secondary viewing area 306, a fourth secondary viewing area 308, and a fourth secondary viewing area 310.

Consistent with various embodiments, primary viewing area 302 can correspond with the second base 102 of FIG. 1B. As shown in top view 360 of FIG. 3B, the viewing frustum 355 can include a display angle 370 and a display angle 372. Additionally, as shown in right side view 365 of FIG. 3B, the viewing frustum can include a display angle 374, and a display angle 376. In certain embodiments, display angle 370 can correspond with display angle β2 132 of FIG. 1B, display angle 372 can correspond with display angle θ2 134 of FIG. 1B, display angle 374 can correspond with display angle 130 α2 of FIG. 1B, and display angle 376 can correspond with display angle 136 Φ2 of FIG. 1B.

In certain embodiments, varying the display angles 370, 372, 374, 376 can vary the size of the area allotted for each portion of the software application. For example, the second secondary viewing area 306 may decrease in size as the display angle 316 increases, where 0° offers high visibility and 90° effectively removes the second secondary viewing area 306 from view. Conversely, as the display angle 316 decreases, the size of the second secondary viewing area 306 may increase. Put differently, first secondary viewing area 304, second secondary viewing area 306, third secondary viewing area 308, and fourth secondary viewing area 310 can "fold out" to increase the viewing area (e.g., the display angle approaches 0°), and "fold in" to decrease the viewing area (e.g., the display angle approaches 90°).

As described herein, in certain embodiments, the viewing frustum 355 can be configured for stereoscopic 3D display. In certain embodiments, this can facilitate a perception of depth for the viewing frustum 355. For example, the primary viewing area 302 may, in certain embodiments, appear to be closer to a user looking at the computer monitor 312 than the first secondary viewing area 304, second secondary viewing area 306, third secondary viewing area 308, and fourth secondary viewing area 310. Accordingly, the first secondary viewing area 304, second secondary viewing area 306, third secondary viewing area 308, and fourth secondary viewing area 310 may appear to extend away from the user along the direction of the Z-axis of coordinate axes 350 as shown in FIG. 3B. Although reference is made herein to stereoscopic 3D display, the 3D effect may be implemented by one or more of a number of 3D technologies. For example, the 3D effect may be implemented via an anaglyph 3D system, a polarized 3D system, an active shutter 3D system, an autostereoscopy system, or the like. Other systems are also possible.

Figure 4:
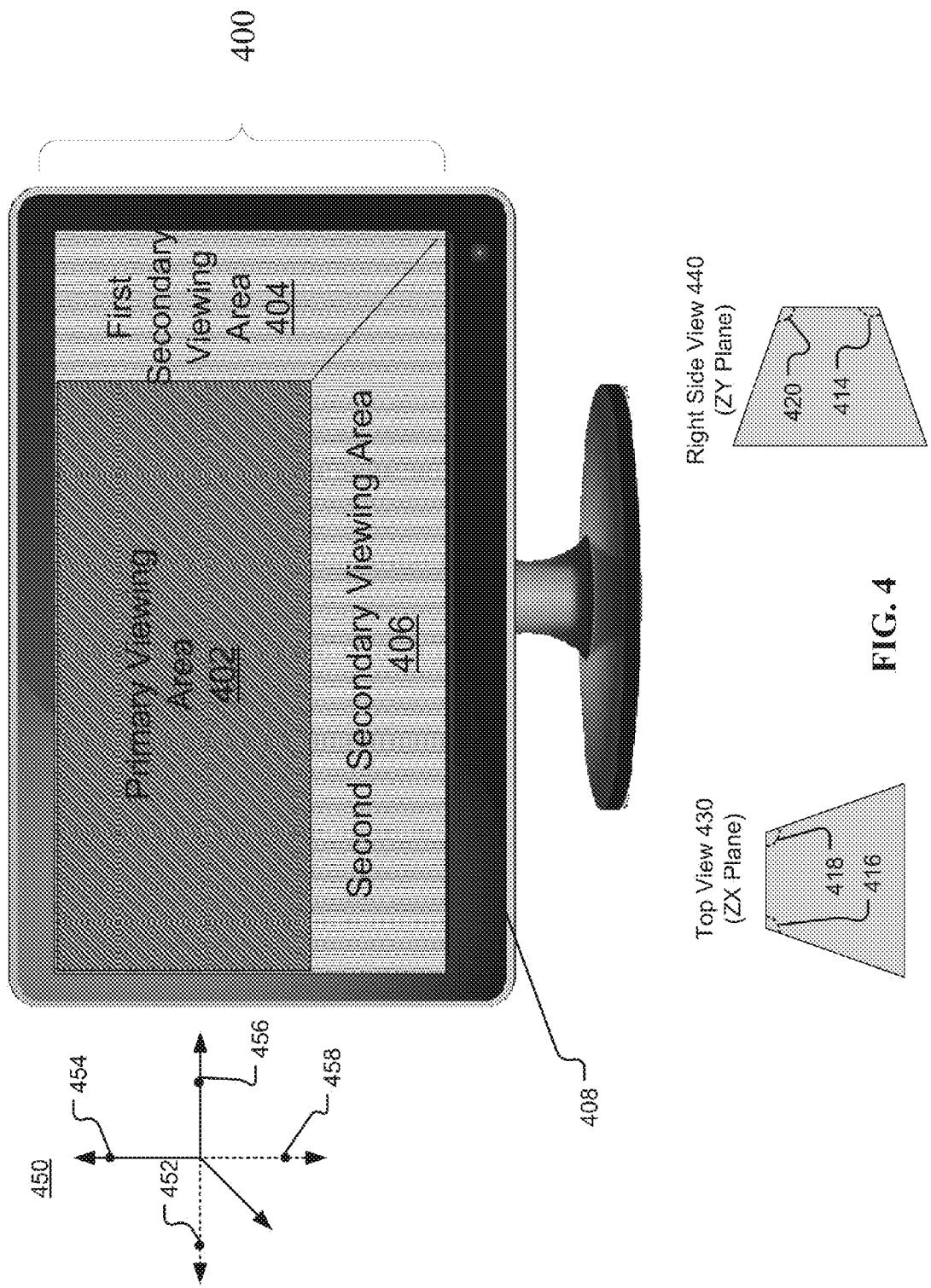
FIG. 4 is an example viewing frustum provided in a display, according to embodiments of the present disclosure.

FIG. 4 is an example viewing frustum 400 provided in a display, according to embodiments of the present disclosure. Aspects of FIG. 4 are directed toward a viewing frustum 400 with a plurality of regions configured to provide one or more portions of a software application. As shown in FIG. 4, the viewing frustum 400 can include a primary viewing area 402, a first secondary viewing area 404, and a second secondary viewing area 406. One or more portions of a software application identified based on optical tracking information from a user may be provided in the primary viewing area 402, the first secondary viewing area 404, and the second secondary viewing area 406.

Consistent with various embodiments, the viewing frustum 400 can be configured to be provided in a stereoscopic 3D display 408. Accordingly, the first secondary viewing area 404 and second secondary viewing area 406 may appear to extend along the direction of the Z-axis of coordinate axes 450. In certain embodiments, primary viewing area 402 may correspond with the first base 112 of FIG. 1A. In certain embodiments, as shown in top view 430 FIG. 4, the viewing frustum 400 can include a display angle 416 and a display angle 418. Additionally, as shown in right side view 440 of FIG. 3A, the viewing frustum can include a display angle 414, and a display angle 420. In certain embodiments, display angle 414 can correspond with display angle α1 114 of FIG. 1A, display angle 416 can correspond with display angle β1 116 of FIG. 1A, display angle 418 can correspond with display angle θ1 118 of FIG. 1A, and display angle 420 can correspond with display angle Φ120 of FIG. 1A. In certain embodiments, reference point 452 of coordinate axes 450 may be the point from which display angle 416 is measured, reference point 454 may be the point from which display angle 420 is measured, reference point 456 may be the point from which display angle 418 is measured, and reference point 458 may be the point from which display angle 414 is measured.

Aspects of FIG. 4 are directed toward a viewing frustum 400 for which multiple viewing areas of the viewing frustum 400 have been reduced, and removed (e.g., become no longer visible) from the viewing frustum 400. In certain embodiments, as described herein, the display angles 414, 416, 418, 420 can be computed based on the viewing scores of a set of portions of a software application. Accordingly, in certain embodiments, the viewing score of a particular portion of the software application may have a low viewing score (e.g., 0). In such a situation, the display angle corresponding to the particular portion of the software application may be calculated to be a value such that the particular portion may be removed from the viewing frustum. For example, as shown in FIG. 4, display angles 416 and 420 may have been determined to 90°, and are therefore no longer visible in the viewing frustum 400.

As described herein, in certain embodiments, primary viewing area 402 may correspond to second base 102 of FIG. 1B. Accordingly, in such a configuration, the first secondary viewing area 404 and second secondary viewing area 406 can "fold out" to increase the viewing area of each secondary viewing area, respectively (e.g., the display angle approaches 0°), and "fold in" to decrease the viewing area of each respective secondary viewing area (e.g., the display angle approaches 90°).

Aspects of the present disclosure, in certain embodiments, are directed toward a heuristic evaluation system. The heuristic evaluation system may, in certain embodiments, provide benefits associated with usability with regard to the viewing frustum 400. In certain embodiments, aspects of the present disclosure can include analyzing, by a heuristic evaluation system, a set of usability characteristics of the frustum. The set of usability characteristics may include a visibility feature and a current workload. The visibility feature may be configured to analyze the size of text of a particular portion to determine whether it is an appropriate size for a user to view at its current size and location. For example, the visibility feature may include determining that, based on the size of the text of a portion provided in a region of the frustum 400, the region containing the text is not placed close enough to the user. The current workload may, for instance, include assessing the number and type of running software applications. In response to analyzing the set of usability characteristics of the frustum, coordinates for the set of regions may be computed based on the set of usability characteristics. Further, the set of regions may be displayed according to the computed coordinates. For example, in certain situations, the user may be involved in a video conference. The heuristic evaluation system may assess the type of applications currently running, identify that a video conference is in progress, and place the region of the frustum in which the video display is provided closer to the user along the Z-axis of coordinate axes 450.

Figure 5:
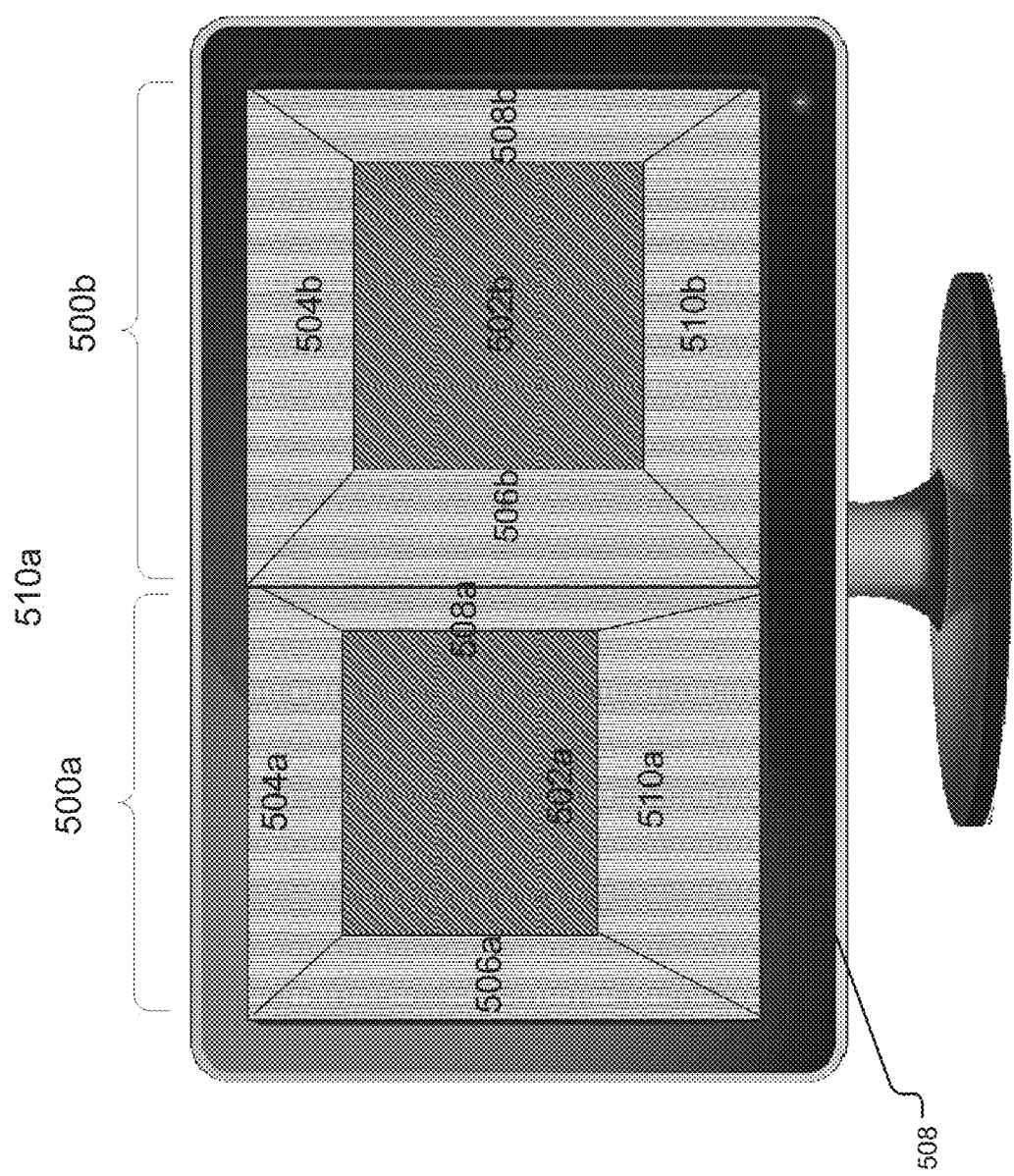
FIG. 5 is an example display including two viewing frustums, according to embodiments of the present disclosure.

FIG. 5 is an example display including two viewing frustums, according to embodiments of the present disclosure. Aspects of FIG. 5 are directed toward providing a first viewing frustum 500a and a second viewing frustum 500b simultaneously in the same display 508. As shown in FIG. 5, the first viewing frustum 500a can include a primary viewing area 502a, a first secondary viewing area 504a, a second secondary viewing area 506a, a third secondary viewing area 508a, and a fourth secondary viewing area 510a. The second viewing frustum 500b can include a primary viewing area 502b, a first secondary viewing area 504b, a second secondary viewing area 506b, a third secondary viewing area 508b, and a fourth secondary viewing area 510b.

Consistent with certain embodiments, aspects of the present disclosure are directed toward providing multiple viewing frustums simultaneously in the same display. Each viewing frustum may be configured to provide portions of a different software application. As described herein, providing multiple viewing frustums simultaneously in the same display can include collecting multiple sets of optical tracking information from a user. Based on a set of viewing coordinates having a temporal feature associated with each set of optical tracking information, a set of viewing scores can be determined for the sets of portions of each software application. Each viewing frustum (e.g., viewing frustum 500a and 500b) can then be generated based on the viewing score of the set of portions of the respective software application.

As an example, consider a scenario in which a user is regularly switching between multiple software applications, such as a web browser and a word processing application. Accordingly, aspects of the present disclosure are directed toward generating a viewing frustum for both the web browser and the word processing application, and providing them in the display 508. Such a configuration may have benefits associated with usability and efficiency. Additionally, although reference is made herein providing two viewing frustums, this is not intended to be limiting, and configurations providing alternate numbers of frustums are also possible.

Figure 6:
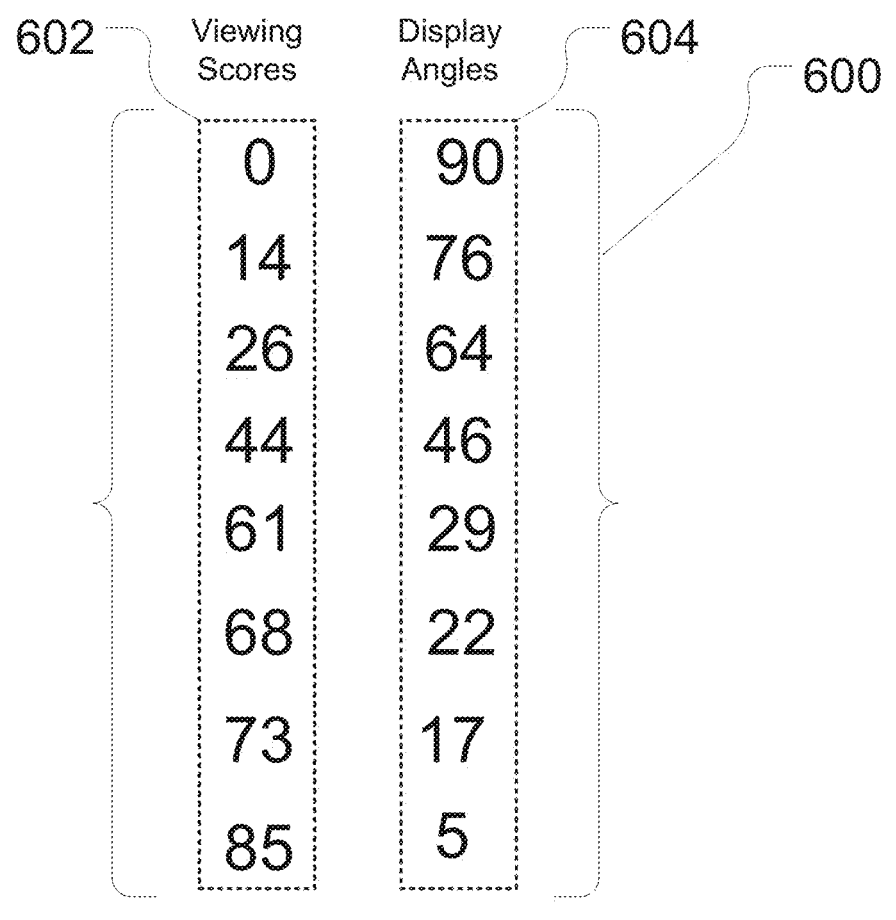

Aspects of the present disclosure, in certain embodiments, are directed toward creating a user profile configured to maintain a set of display preferences for a viewing frustum. The user profile may, in certain embodiments, include a multi-dimensional array configured to store a set of viewing scores and a set of display angles for a set of portions associated with the viewing frustum. As an example, FIG. 6 illustrates an example multi-dimensional array 600 including a column of viewing scores 602 and a column of calculated display angles 604. As described herein, the display angles may be calculated by an algorithm based on the viewing score of each portion of the set of portions, the area of one or more portions, and the number of portions. As an example, one algorithm that could be used to determine the display angles is given by $\lambda = C(1/(V \times A))$, where $\lambda$ is the display angle, C is a coefficient that may include the number of portions, V is the viewing score, and A is the area of the portion. Although referenced herein, this algorithm is not intended to be limiting, and other algorithms and methods of computing the display angles are also possible.

Although reference is made herein and in the figures to using a square frustum for the viewing frustum 400, other types of frustums are also possible. As an example, in certain embodiments, the viewing frustum may be the frustum of a cone. In such a configuration, one of the bases of the cone frustum could be the primary viewing area 402, while the side of the cone could be the secondary viewing area. Other types of frustums are also possible.

Figure 7:
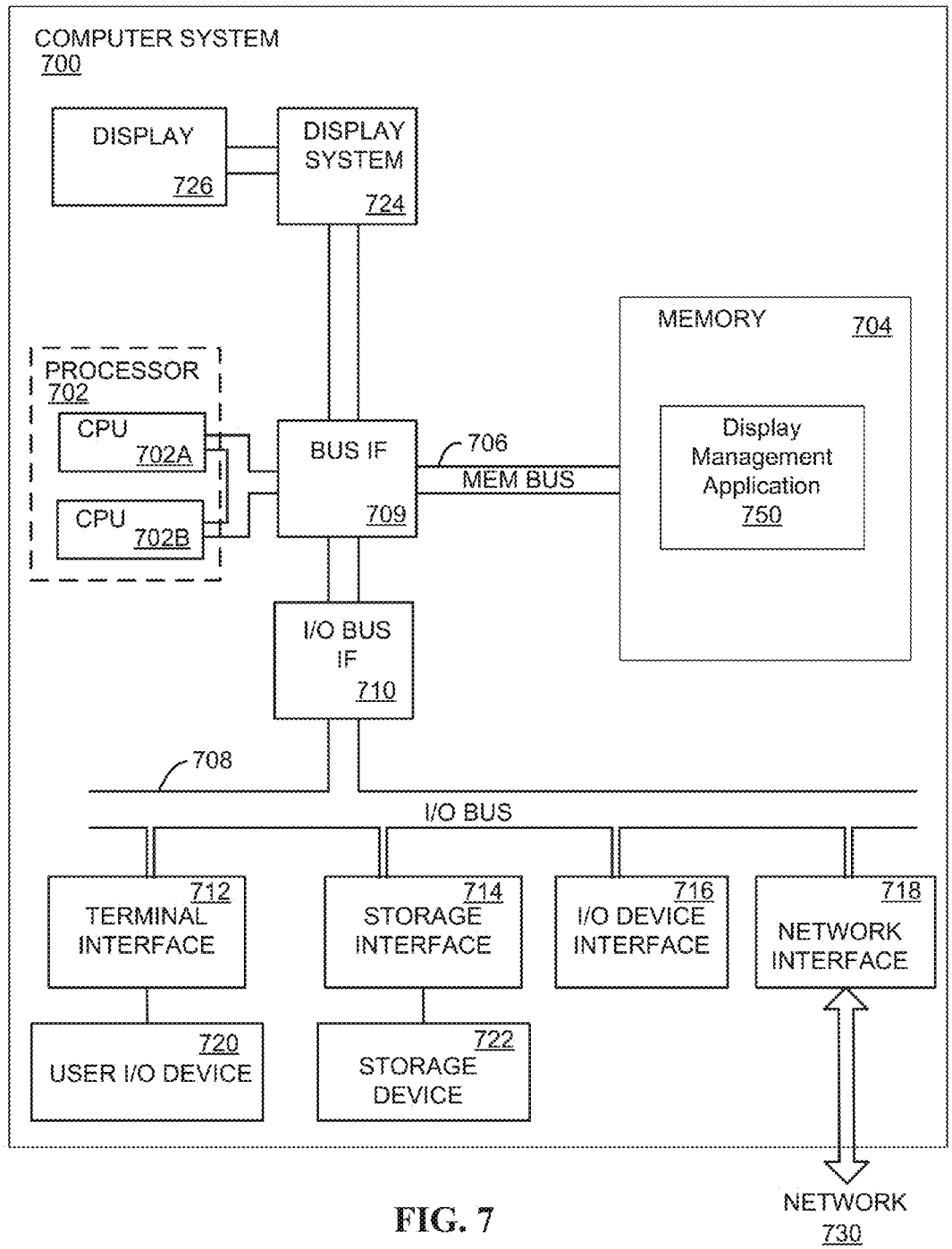
FIG. 7 depicts a high-level block diagram of a computer system for implementing various embodiments, according to embodiments of the present disclosure.

FIG. 7 depicts a high-level block diagram of a computer system 700 for implementing various embodiments. The mechanisms and apparatus of the various embodiments disclosed herein apply equally to any appropriate computing system. The major components of the computer system 700 include one or more processors 702, a memory 704, a terminal interface 712, a storage interface 714, an I/O (Input/Output) device interface 716, and a network interface 718, all of which are communicatively coupled, directly or indirectly, for inter-component communication via a memory bus 706, an I/O bus 708, bus interface unit 709, and an I/O bus interface unit 710.

The computer system 700 may contain one or more general-purpose programmable central processing units (CPUs) 702A and 702B, herein generically referred to as the processor 702. In embodiments, the computer system 700 may contain multiple processors; however, in certain embodiments, the computer system 700 may alternatively be a single CPU system. Each processor 702 executes instructions stored in the memory 704 and may include one or more levels of on-board cache.

In embodiments, the memory 704 may include a random-access semiconductor memory, storage device, or storage medium (either volatile or non-volatile) for storing or encoding data and programs. In certain embodiments, the memory 704 represents the entire virtual memory of the computer system 700, and may also include the virtual memory of other computer systems coupled to the computer system 700 or connected via a network. The memory 704 can be conceptually viewed as a single monolithic entity, but in other embodiments the memory 704 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 704 may store all or a portion of the various programs, modules and data structures for processing data transfers as discussed herein. For instance, the memory 704 can store a display management application 750. In embodiments, the display management application 750 may include instructions or statements that execute on the processor 702 or instructions or statements that are interpreted by instructions or statements that execute on the processor 702 to carry out the functions as further described below. In certain embodiments, the display management application 750 is implemented in hardware via semiconductor devices, chips, logical gates, circuits, circuit cards, and/or other physical hardware devices in lieu of, or in addition to, a processor-based system. In embodiments, the display management application 750 may include data in addition to instructions or statements.

The computer system 700 may include a bus interface unit 709 to handle communications among the processor 702, the memory 704, a display system 724, and the I/O bus interface unit 710. The I/O bus interface unit 710 may be coupled with the I/O bus 708 for transferring data to and from the various I/O units. The I/O bus interface unit 710 communicates with multiple I/O interface units 712, 714, 716, and 718, which are also known as I/O processors (IOPs) or I/O adapters (IOAs), through the I/O bus 708. The display system 724 may include a display controller, a display memory, or both. The display controller may provide video, audio, or both types of data to a display device 726. The display memory may be a dedicated memory for buffering video data. The display system 724 may be coupled with a display device 726, such as a standalone display screen, computer monitor, television, or a tablet or handheld device display. In one embodiment, the display device 726 may include one or more speakers for rendering audio. Alternatively, one or more speakers for rendering audio may be coupled with an I/O interface unit. In alternate embodiments, one or more of the functions provided by the display system 724 may be on board an integrated circuit that also includes the processor 702. In addition, one or more of the functions provided by the bus interface unit 709 may be on board an integrated circuit that also includes the processor 702.

The I/O interface units support communication with a variety of storage and I/O devices. For example, the terminal interface unit 712 supports the attachment of one or more user I/O devices 720, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 720 and the computer system 700, and may receive output data via the user output devices. For example, a user interface may be presented via the user I/O device 720, such as displayed on a display device, played via a speaker, or printed via a printer.

The storage interface 714 supports the attachment of one or more disk drives or direct access storage devices 722 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 722 may be implemented via any type of secondary storage device. The contents of the memory 704, or any portion thereof, may be stored to and retrieved from the storage device 722 as needed. The I/O device interface 716 provides an interface to any of various other I/O devices or devices of other types, such as printers or fax machines. The network interface 718 provides one or more communication paths from the computer system 700 to other digital devices and computer systems; these communication paths may include, e.g., one or more networks 730.

Although the computer system 700 shown in FIG. 7 illustrates a particular bus structure providing a direct communication path among the processors 702, the memory 704, the bus interface 709, the display system 724, and the I/O bus interface unit 710, in alternative embodiments the computer system 700 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 710 and the I/O bus 708 are shown as single respective units, the computer system 700 may, in fact, contain multiple I/O bus interface units 710 and/or multiple I/O buses 708. While multiple I/O interface units are shown, which separate the I/O bus 708 from various communications paths running to the various I/O devices, in other embodiments, some or all of the I/O devices are connected directly to one or more system I/O buses.

In various embodiments, the computer system 700 is a multi-user mainframe computer system, a single-user system, or a server computer or similar device that has little or no direct user interface, but receives requests from other computer systems (clients). In other embodiments, the computer system 700 may be implemented as a desktop computer, portable computer, laptop or notebook computer, tablet computer, pocket computer, telephone, smart phone, or any other suitable type of electronic device.

FIG. 7 depicts several major components of the computer system 700. Individual components, however, may have greater complexity than represented in FIG. 7, components other than or in addition to those shown in FIG. 7 may be present, and the number, type, and configuration of such components may vary. Several particular examples of additional complexity or additional variations are disclosed herein; these are by way of example only and are not necessarily the only such variations. The various program components illustrated in FIG. 7 may be implemented, in various embodiments, in a number of different manners, including using various computer applications, routines, components, programs, objects, modules, data structures, etc., which may be referred to herein as "software," "computer programs," or simply "programs."

Figure 8:
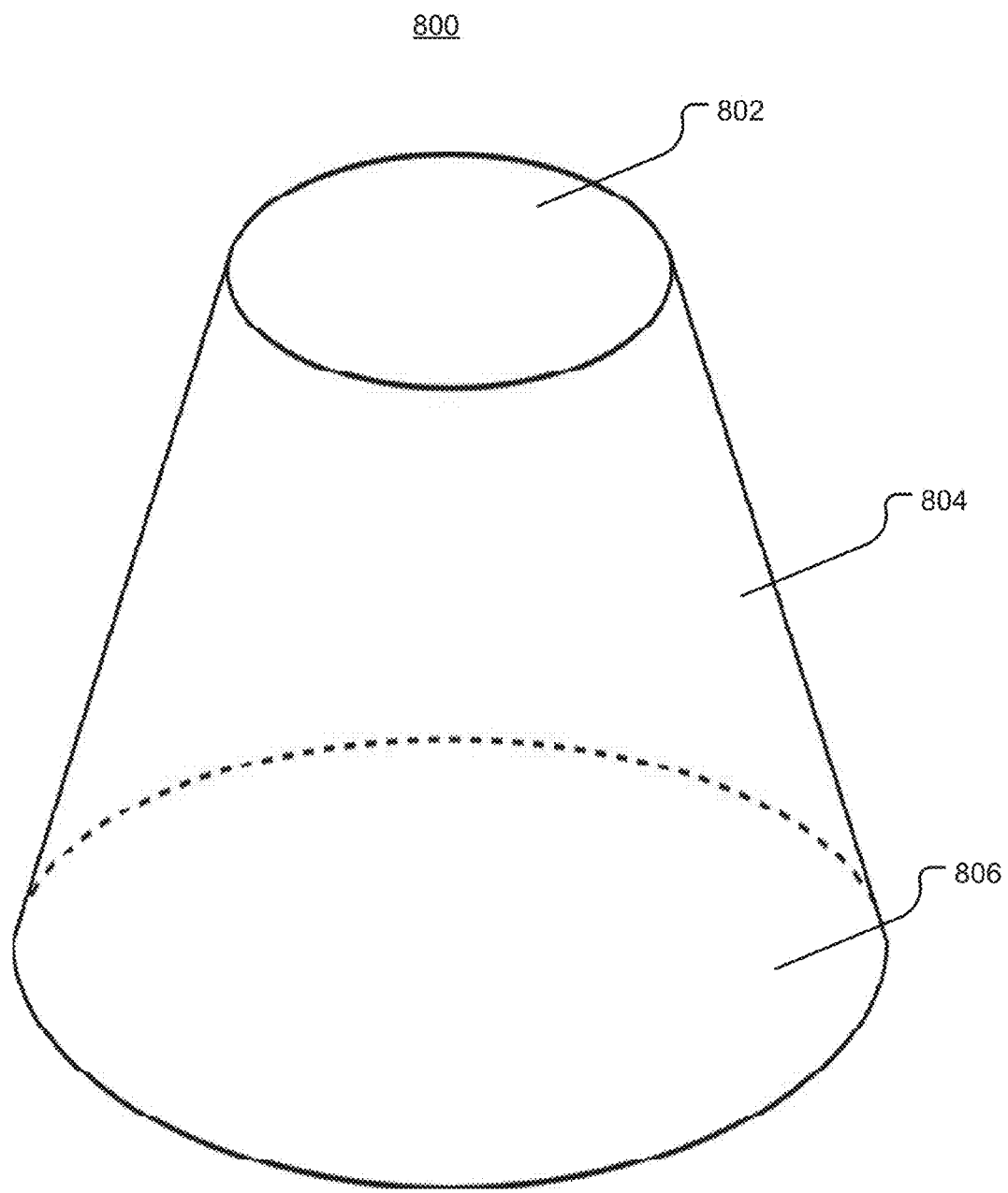
FIG. 8 illustrates an example cone frustum for managing software applications of a 3D display, according to embodiments of the present disclosure.

FIG. 8 illustrates an example cone frustum 800 for managing software applications of a 3D display, consistent with embodiments of the present disclosure. Aspects of FIG. 8 are directed toward a cone frustum that can be generated to manage portions of a software application in a 3D display. Consistent with various embodiments, the cone frustum 800 may include a first base 802, a curved region 804, and a second base 806. In certain embodiments, the first base 802 may be used as a primary viewing region configured to provide one or more portions of a software application. In certain embodiments, the second base 806 may be configured as the primary viewing region. In certain embodiments, the curved region 804 may be used as a secondary viewing region configured to provide one or more portions of a software application. Other configurations for the cone frustum 800, as well as other types of frustums, are also contemplated for managing software applications of a 3D display.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for managing a display for a software application having a set of portions, the method comprising:
    collecting, for a first portion of the set of portions and a second portion of the set of portions, optical tracking information including a set of viewing coordinates having a temporal feature;
    determining, based on the optical tracking information including the set of viewing coordinates having the temporal feature, a set of viewing scores including a first group of viewing scores and a second group of viewing scores; and
    generating a frustum having a set of regions, the set of regions including:
        a first region, to provide the first portion, based on the first group of viewing scores; and
        a second region, to provide the second portion, based on the second group of viewing scores;
    wherein the first group of the set of viewing scores is greater than the second group of the set of viewing scores, and wherein the first region of the set of regions is a primary viewing area of the frustum; and
    wherein the method further comprises:
    computing, for the second portion, a z-plane display angle based on a viewing score of the second group of the set of viewing scores; and
    generating the frustum using the z-plane display angle, wherein the z-plane display angle is inversely proportional to the viewing score of the second group of the set of viewing scores.

2. The method of claim 1, wherein the temporal feature includes a viewing frequency and a gaze duration.

3. The method of claim 2, where determining the set of viewing scores for the set of portions of the software application further comprises:
    identifying a first fixation of the set of viewing coordinates;
    weighting the first fixation and the set of viewing coordinates based on the viewing frequency and the gaze duration; and
    assigning a viewing score of the set of viewing scores to a third portion of the set of portions.

4. The method of claim 1, further comprising:
    collecting another optical tracking information for another first portion and another second portion of another set of portions of another software application, the another optical tracking information including another set of viewing coordinates having another temporal feature;
    determining, based on the another set of viewing coordinates having another temporal feature, another set of viewing scores including another first group of viewing scores and another second group of viewing scores;
    generating another frustum having another set of regions, the another set of regions including:
        another first region, to provide the another first portion, based on the another first group of viewing scores; and
        another second region, to provide the another second portion, based on the another second group of viewing scores.

5. The method of claim 1, further comprising:
    creating a user profile having a multi-dimensional array to maintain a set of display preferences including a set of viewing scores and a set of z-plane display angles for a set of portions associated with the frustum.

6. The method of claim 1, wherein the frustum includes a first base and four peripheral sides, wherein the first base of the frustum is the first region of the frustum and the four peripheral sides are the second region of the frustum, and wherein the angle between a side of the four peripheral sides and the first base is based on the z-plane display angle.

7. A computer-implemented method for managing a display for a software application having a set of portions, the method comprising:
    collecting, for a first portion of the set of portions and a second portion of the set of portions, optical tracking information including a set of viewing coordinates having a temporal feature;
    determining, based on the optical tracking information including the set of viewing coordinates having the temporal feature, a set of viewing scores including a first group of viewing scores and a second group of viewing scores;
    generating a frustum having a set of regions, the set of regions including:
        a first region, to provide the first portion, based on the first group of viewing scores; and
        a second region, to provide the second portion, based on the second group of viewing scores;
    wherein the method further comprises:
    analyzing, by a heuristic evaluation system, a set of usability characteristics of the frustum, the set of usability characteristics including a current workload and a visibility feature configured to analyze text size;
    computing, in response to analyzing the set of usability characteristics of the frustum, a set of adjusted coordinates for the set of regions by utilizing the set of usability characteristics; and
    displaying the set of regions according to the set of adjusted coordinates.

8. The method of claim 7, further comprising:
    measuring, by a head-tracking system, a first head movement including a rotation angle with respect to a reference direction;
    determining, based on the first head movement including the rotation angle with respect to the reference direction, a first translation for the frustum; and
    shifting the frustum in the display based on the first translation.

* * * * *